United States Patent
Baer

(10) Patent No.: US 7,544,034 B2
(45) Date of Patent: Jun. 9, 2009

(54) ELEVATING PLATFORM SYSTEM

(76) Inventor: Gerd Baer, Gerd Baer, Zueckwolfstr. 17/1, 74078 Heilbronn (DE)

( * ) Notice: Subject to any disclaimer, the term of this patent is extended or adjusted under 35 U.S.C. 154(b) by 421 days.

(21) Appl. No.: 10/566,084

(22) PCT Filed: Jul. 30, 2004

(86) PCT No.: PCT/EP2004/008565

§ 371 (c)(1),
(2), (4) Date: Jul. 31, 2006

(87) PCT Pub. No.: WO2005/012035

PCT Pub. Date: Feb. 10, 2005

(65) Prior Publication Data

US 2008/0116674 A1 May 22, 2008

(30) Foreign Application Priority Data

Aug. 1, 2003 (EP) .................................. 03017414

(51) Int. Cl.
*B60P 1/44* (2006.01)
(52) U.S. Cl. ..................................... 414/557; 414/917
(58) Field of Classification Search ................. 414/556, 414/557, 558, 917
See application file for complete search history.

(56) References Cited

U.S. PATENT DOCUMENTS 3,737,055 A * 6/1973 Pettit .......................... 414/558
3,883,014 A * 5/1975 Glomski et al. ............. 414/557
3,977,544 A * 8/1976 D'Hollander ................ 414/680
4,111,317 A * 9/1978 Robinson ..................... 414/680
4,147,261 A * 4/1979 Dautel et al. ................. 414/557
4,780,044 A * 10/1988 Elskamp ..................... 414/557
5,588,793 A * 12/1996 Chang ........................ 414/557
6,082,958 A * 7/2000 Jensen ........................ 414/557
6,375,404 B1 * 4/2002 Jensen ........................ 414/557

FOREIGN PATENT DOCUMENTS

DE 3345589 A1 * 6/1985 .................. 414/557
DE 3527935 A1 * 2/1987 .................. 414/558
EP 0 808 747 11/1997

* cited by examiner

*Primary Examiner*—James Keenan
(74) *Attorney, Agent, or Firm*—Paul Vincent

(57) ABSTRACT

An elevating platform system (1) which can be fixed to vehicles, comprising a platform (2) and a parallelogram shaped lifting gear consisting of two horizontally spaced carrier arms (3,4) for bearing the platform (2), a parallel cylinder (10) for swiveling the platform (2) from a vertical travel position into a horizontal working position and vice-versa, in addition to a lifting cylinder (7) used to lift and lower the platform (2) in the working position thereof. The lifting cylinder (7) engages with a lifting cylinder lever (6) which can be rotated about the pivoting axis (5) of the carrier arms (2,3) and forms a triangle of forces therewith. The first carrier arm (3) is elastically and movingly coupled to the lifting cylinder lever (6) in the direction of lifting and the second carrier arm (4) is connected to the lifting cylinder lever (6) by means of a torsion profile (9). The elastic movement coupling is formed by a spring unit (8) which is supported on the first carrier arm (3) and on the lifting cylinder lever (6).

10 Claims, 4 Drawing Sheets

US 7,544,034 B2

ELEVATING PLATFORM SYSTEM

This application is the national stage of PCT/EP2004/008565 filed on Jul. 30, 2004 and also claims Paris Convention priority of EP 03 017 414.8 filed on Aug. 01, 2003.

BACKGROUND OF THE INVENTION

The present invention concerns an elevating platform system for attachment to a vehicle, having a platform and a substantially parallel lifting mechanism which includes two horizontally separated carrier arms for supporting the platform, a parallel cylinder for pivoting the platform from its vertical traveling position into its horizontal working position and vice versa as well as a lifting cylinder for raising and lowering the platform in its working location, wherein the lifting cylinder engages a lifting cylinder lever which is borne for rotation about a pivot axis of the support arm and forms a force triangle together therewith, wherein a first support arm is elastically coupled in the stroke direction for motion together with the lifting cylinder lever and a second arm is connected to the lifting cylinder lever by means of a torsion profile.

An elevating platform system of this kind is e.g. disclosed in EPA 0980786.

EPA 0980786 discloses an elevating platform whose elevating lifting cylinder lever is horizontally displaced relative to the associated first support arm. The lifting cylinder lever and the first carrier arm are borne for rotation, independent of each other, about a common rotational axis and are connected to each other at a radial separation with respect to the common rotational axis by means of a bolt so that a free end of the first support arm proximate the platform is elastically coupled to the lifting cylinder lever for resilient motion in the lifting direction. After raising the platform up to the height of the truck loading level, further activation of the lifting cylinder facilitates further lifting motion of the lifting cylinder lever which is transferred to the second lifting arm by means of the torsion pipe. In this fashion, a step and gap free transition from the platform to the truck loading surface can be achieved even if only the platform is loaded.

EP-A-0808747 also discloses an elevating platform system with which a first support arm is disposed between two parallel separated arms. The two arms form, together with the lifting cylinder, a force triangle and are borne for rotation about the axis of rotation of the two carrier arms. The first carrier arm is welded to both arms at a radial separation with respect to the rotational axis by means of a transverse support so that its free end facing the platform is elastically, resiliently coupled for motion together with the lifting drive in the lifting direction.

EP-A-1106431 discloses an elevating platform system with which a spring is supported on the arm forming a force triangle together with a lifting cylinder, the other end of the spring being supported on the platform. The spring, elastically, resiliently couples the platform to the lifting mechanism for motion in the lifting direction.

EP-A-1221399 discloses an elevating platform system having a parallel arm disposed horizontally next to the first support arm which is borne for rotation about a common rotational axis independent of the first support arm and whose other end is connected to the first support arm by means of a universal joint. The lifting cylinder engages the universal joint between the first support arm and the parallel arm. The first carrier arm is elastically, resiliently coupled for motion in the lifting direction to the lifting mechanism by means of a resilient element which is supported at one end on the first support arm and on the torsion pipe at its other end.

DE-C-10205669 discloses another elevating platform system with which the lifting cylinder engages the first support arm by means of an elastic compensation unit. The elastic compensation unit is borne for rotation on the first support arm in opposition to the action of a spring. Through further activation of the lifting cylinder and following lifting of the loading platform up to the height of the truck loading surface, the compensation unit is thereby further moved in opposition to the action of the spring. This motion is transferred to the second support arm by means of the torsion pipe.

In contrast thereto it is the purpose of the present invention to simplify an elevating platform system of the above mentioned kind.

SUMMARY OF THE INVENTION

This purpose is achieved in accordance with the invention in that the elastic coupling for motion is effected by means of a spring unit whose one side is supported on the first support arm and whose other side is supported on the lifting cylinder lever or on the end of the lifting cylinder.

In a first preferred embodiment of the invention, the first carrier arm and the lifting cylinder lever are borne for rotation about a common rotational axis and independent of each other. In another preferred embodiment, the first carrier arm is borne for rotation on the lifting cylinder lever at a radial separation (e.g. approximately 100 mm) with respect to its axis of rotation.

The spring unit preferentially has a compression spring, in particular a helical spring or a rubber spring (e.g. made from polyurethane).

The lifting cylinder lever preferentially has two parallel separated arms between which the first carrier arm is disposed. In order to prevent the two arms of the lifting cylinder lever from rotating with respect to each other, a connecting device bearing a torsion profile is attached to one arm of the lifting cylinder lever, in particular to an inner sided arm and seats on the other arm.

Further advantageous configurations of the invention are the subject of the dependent claims.

BRIEF DESCRIPTION OF THE DRAWING

Further advantages of the invention can be derived from the description and the drawing. The above mentioned features and those to be further delineated below can be used alone or in arbitrary mutual combination. The embodiments shown and described are not to be considered exhaustive enumeration rather have exemplary character for illustration of the invention.

DESCRIPTION OF THE PREFERRED EMBODIMENT

Figure 1:
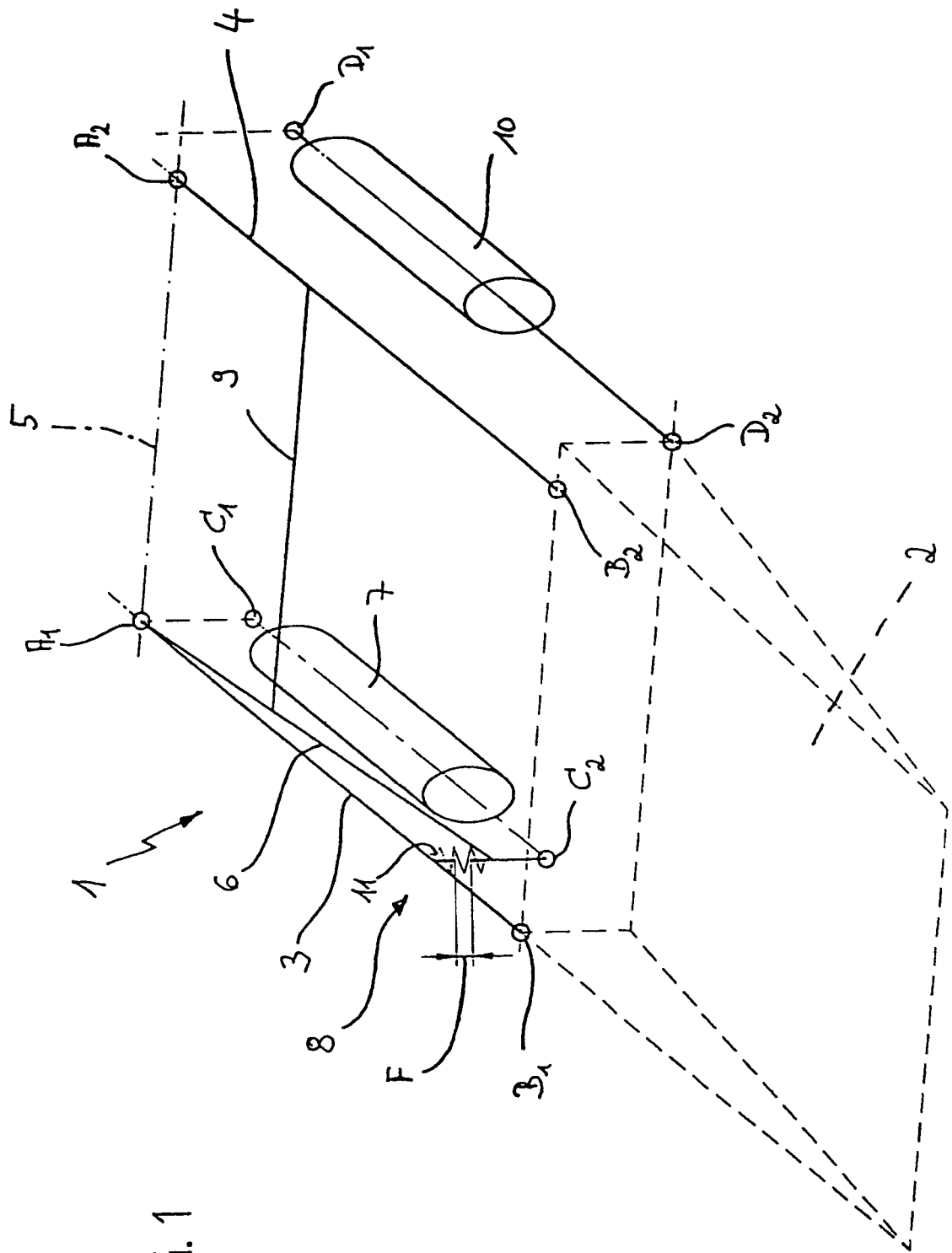
FIG. 1 schematically shows a first embodiment of the elevating platform system in accordance with the invention with which the first carrier arm and the lifting cylinder lever are borne for rotation about a common rotational axis, independent of each other.

FIG. 1 schematically shows an elevating platform system 1 for attachment to the frame of a vehicle, which is not shown in FIG. 1 for reasons of clarity. The supporting system points of the platform 2 are indicated by $A_1$ and $B_1$, $A_2$ and $B_2$ as well as $D_1$ and $D_2$.

The elevating platform system 1 has a parallelogram-shaped lifting mechanism whose basic elements include two carrier arms 3, 4 which are borne for rotation about a common rotational axis 5 at the rotational points $A_1$ and $A_2$ at the side facing the vehicle. A lifting cylinder lever 6 and a lifting cylinder 7 are disposed below the first carrier arm 3. The lifting cylinder 7 is borne proximate the vehicle for pivoting about the pivot point $C_1$ and the lifting cylinder lever 6 is borne for rotation at point $A_1$ independent of the first supporting arm 3 and also about the rotational axis 5. The lifting cylinder 7 engages the lifting cylinder lever 6 at location $C_2$ to form a first triangle $C_1$, $C_2$, $A_1$. The force of the lifting cylinder 7 is introduced into the lifting cylinder lever 6 at point $C_2$ which describes radial motion about its point of rotation $A_1$.

The transfer of the rotational motion and of the forces from the lifting cylinder lever 6 onto the first support arm 3 is effected through an intermediately disposed spring unit 8 and is passed onto the second support arm 4 through a relatively long torsion and bending profile (torsion pipe) 9. Since this latter member can also assume the function of a lower travel protective element it cannot be disposed in the vicinity of the two support arms 3, 4 and is therefore disposed below same and borne via connecting devices (not shown in FIG. 1) on the lifting cylinder lever 6 or on the second support arm 4 for secure mutual rotation therewith. Due to the relatively large length of the torsion and bending profile 9 an increased torsion angle results under equal loads. Of course, this force transfer has a much larger elasticity and therefore leads to a larger elastic spring loading in consequence of which a larger rotational angle occurs for the second support arm 4 about its point of rotation $A_2$ relative to the first support arm 3 about its point of rotation $A_1$.

Since a torsion pipe 9 is attached to the lifting cylinder lever 6 which, precedes the rotation angle of the first support arm 3 in dependence on the load, the larger torsion angle and the elasticity of the compensation device are compensated. This causes the first and the second support arm 3 and 4 to move synchronously with respect to each other.

A parallel cylinder 10 is hinged at the vehicle side at point $D_1$ and attached to the platform 2 at point $D_2$. The cylinder 10 has the function of closing the platform and performing other conventional functions which are therefore not described in greater detail. It also leads to a parallel guidance and is therefore horizontally displaced in an inward direction compared to the second support arm 4 and disposed parallel to the second support arm 4. During lifting and lowering, the parallel cylinder 10 acts as a static pressure support.

The spring unit 8 is formed from a rubber spring 11 which can be compressed to a sufficient extent (maximum spring path F) until an abutment pin of the lifting cylinder lever 6 seats on an abutment pin of the first carrier arm 3.

Figure 2:
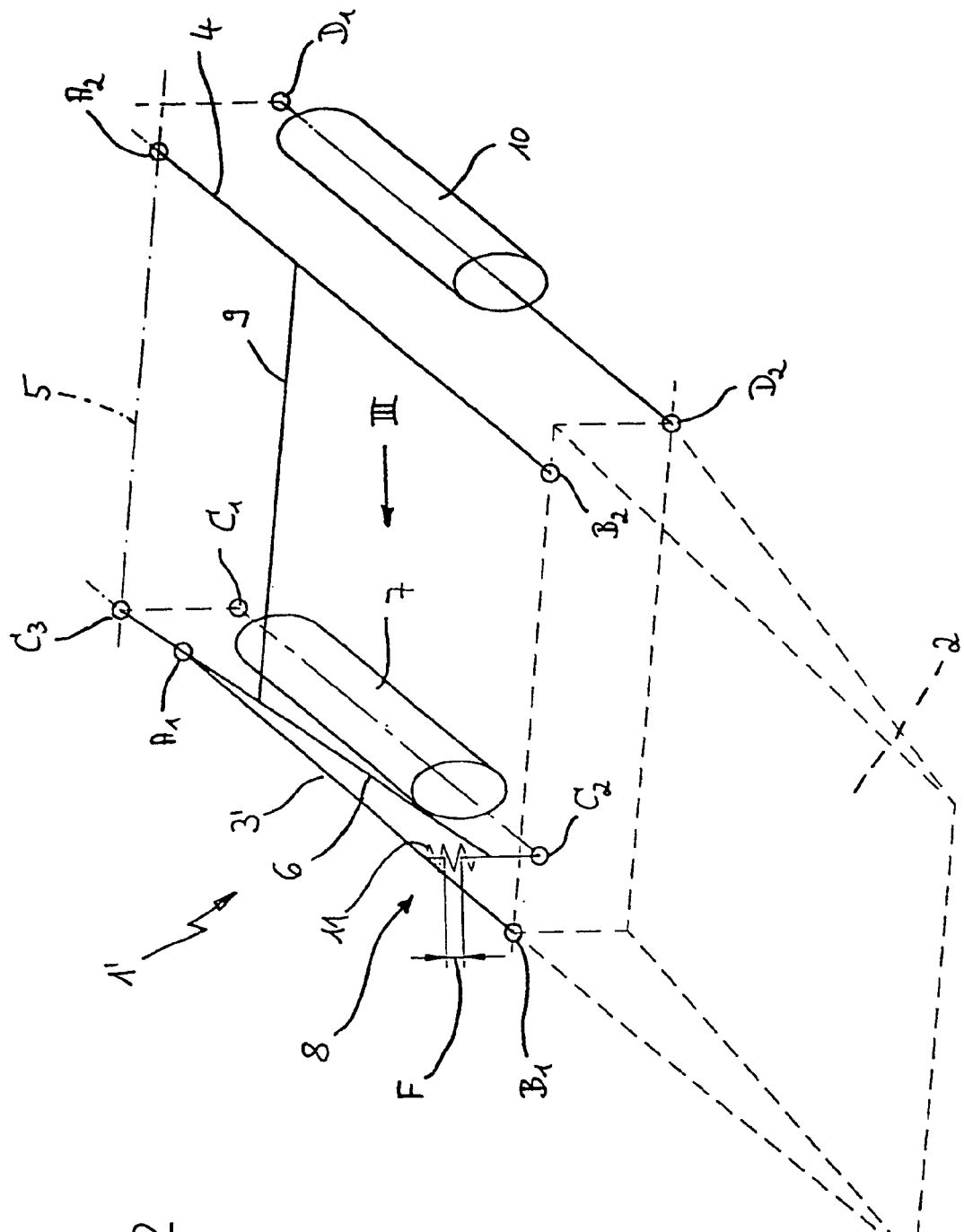
FIG. 2 schematically shows a second embodiment of the lifting elevating platform system in accordance with the invention with which the first carrier arm is borne for rotation on the lifting cylinder lever at a radial separation from its rotational axis, in a representation analogous to FIG. 1.

The elevating platform system 1' of FIG. 2 is distinguished from the above mentioned elevating platform system 1 only in that the first carrier arm 3' is borne for rotation on lifting cylinder lever 6 at a radial separation (e.g. 100 mm) with respect to its axis of rotation 5 at rotation point $A_1$.

After lifting the platform 2 up to the height of a truck loading level, a further lifting motion of the lifting cylinder lever is possible which is transferred via torsion pipe 9 onto the second lifting arm 4 and which is effected through further action of the lifting cylinder 7. This is particularly the case for a platform which is not loaded. In this manner, a step and gap-free transition from the platform 2 to the truck loading floor can be achieved even in the event that the platform 2 is partially or completely loaded.

Figure 3:
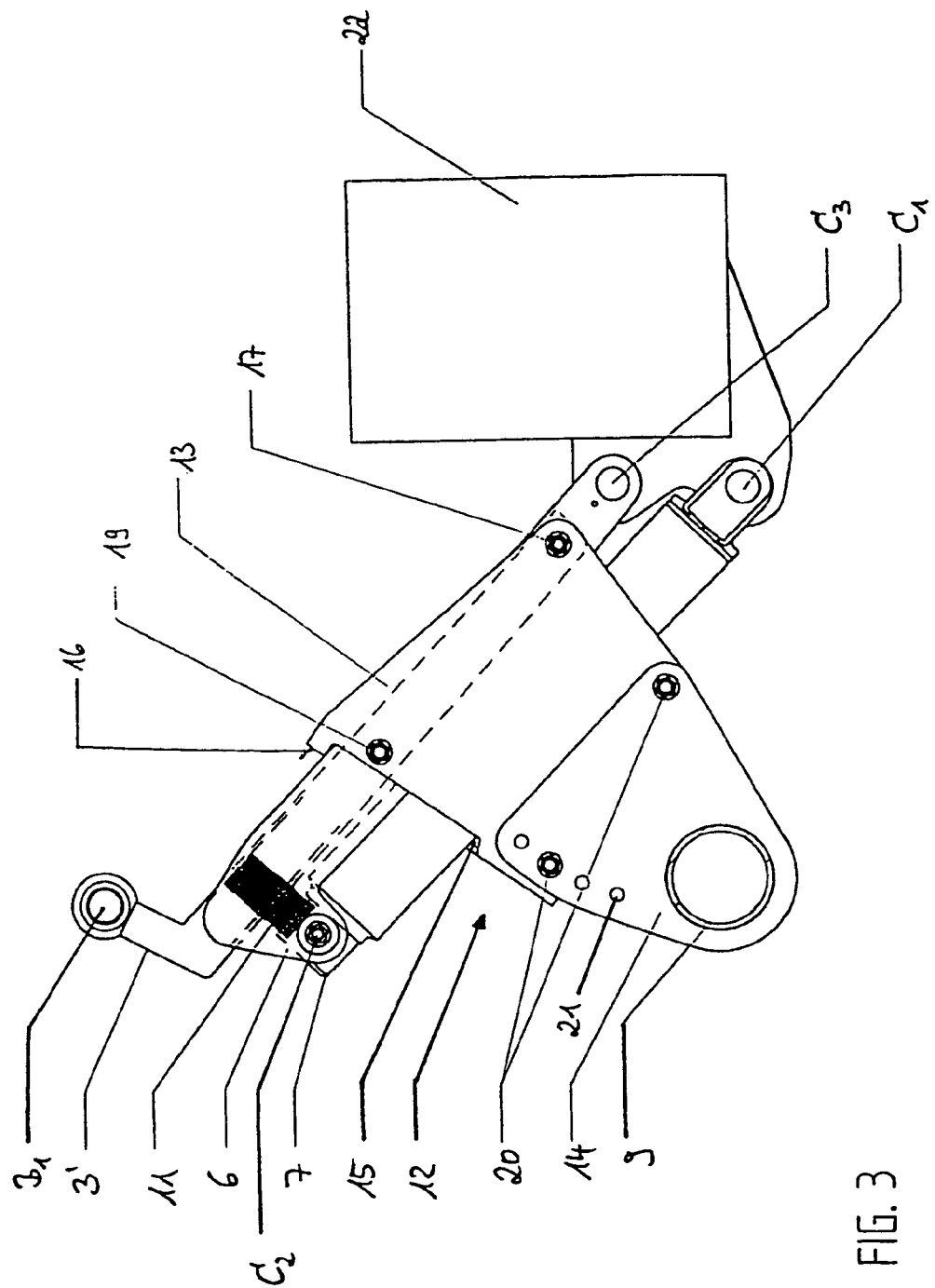
FIG. 3 shows a side view of the left carrier device of FIG. 2 of the elevating platform system in accordance to III in FIG. 2 with a connecting device not shown in FIG. 2.
Figure 4:
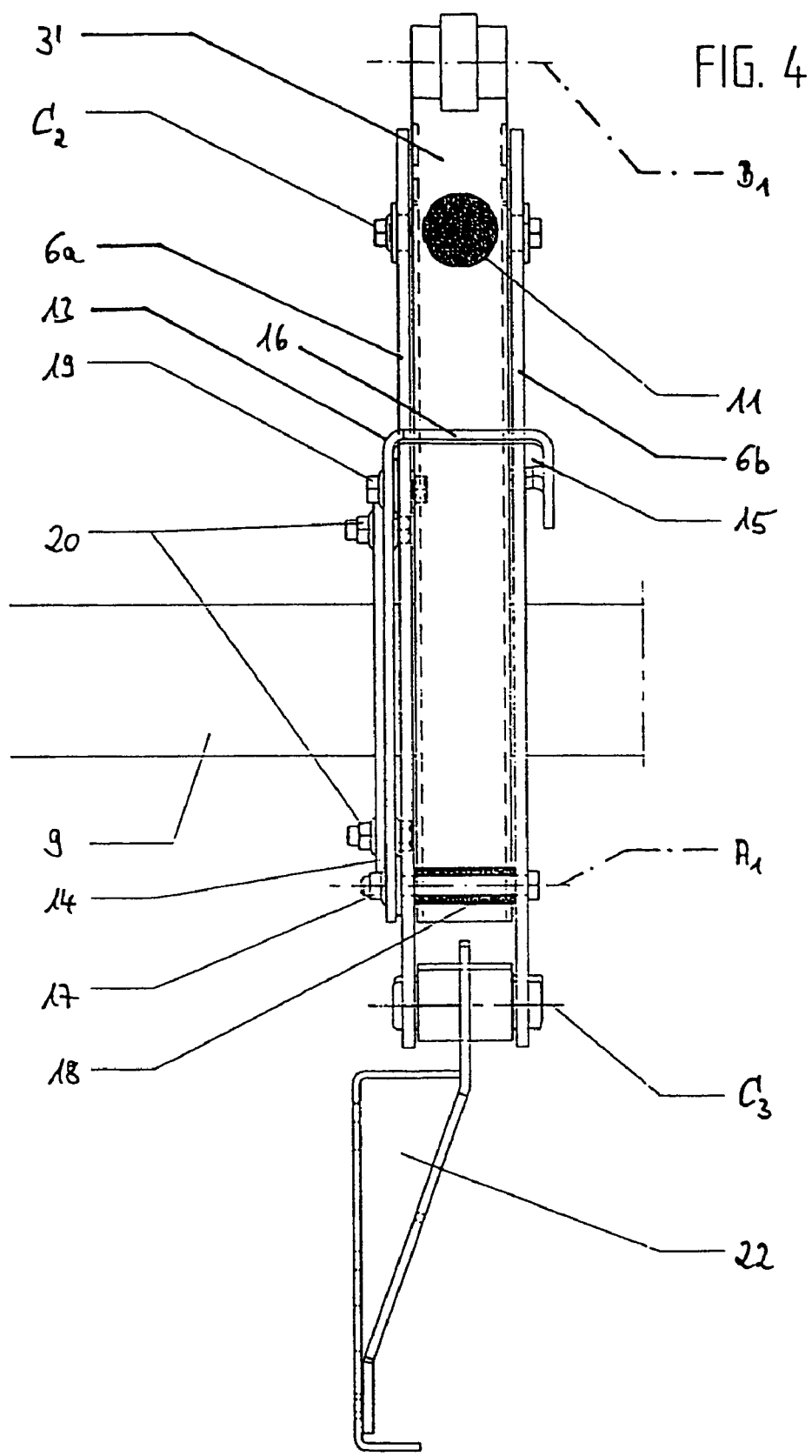
FIG. 4 shows a plan view of the left carrier work of the elevating platform system in accordance with FIG. 3.

FIG. 3 shows that the torsion pipe 9 at the lifting cylinder side is attached to the lifting cylinder lever 6 by means of a connecting device 12. As shown in FIG. 4 the lifting cylinder lever 6 is formed from two parallel separated arms 6a, 6b, between which the first support arm 3' is disposed. The connecting device 12 includes two connecting plates 13 and 14 which are bolted to each other.

The connecting plate 13 is bent at two locations and defines a large window 15 through which the first support arm 3', the two support arms 6a and 6b of the lifting cylinder lever 6 and the lifting cylinder lever 7 extend. An upper support 16 of the connecting plate 13 seats on both arms 6a and 6b. The connecting plate 13 is attached at 100 mm separation with respect to rotational point $C_3$ of the lifting cylinder lever 6 by means of a through bolt 17 which extends through both arms 6a, 6b of the lifting cylinder lever and has a hollow separating bolt 18 which separates the two arms 6a, 6b. The first carrier arm 3' is borne on the separation bolt 18 and its end seats on the rubber spring 11. The second attachment of the connecting plate 13 is effected by second screw 19 which only connects the inner sided arm 6a of the lifting cylinder lever to the connecting plate 13. This screw connection is only used to prevent the connecting device 12 from rotating in an upward direction in the event of extreme lower travel protective forces such that the lower region of the window 15 does not strike against the lifting cylinder piston arm. The operational forces which are introduced from the lifting cylinder 7 or its triangle of forces via the arm 6a, 6b of the lifting cylinder lever 6 and into the connecting device 12 are transferred solely by means of the positive connection with which the two arms 6a, 6b transfer load to the upper support 16 of the connecting device 12. Without the seating of the connecting plate 13 on the outer arms 6b, the entire lifting arm e.g. lifting arm 3', arms 6a and 6b of the lifting cylinder 7 could twist under load due to the one sided attachment of the connecting plate 13 to the inner sided arm 6a.

The connecting plate 14 is attached to the first connecting plate 13 by means of two bolts 20. A plurality of attachment holes 21 are fashioned in the connecting plate 14 and are located about a radius with respect to the other bolt and facilitate adjustment of the height of the second connecting plate 14 and thereby of the torsion pipe 9 forming the lower traveling protective device. In addition, FIGS. 3 and 4 show a connecting flange 22 at the side proximate the vehicle on which the two arms 6a and 6b of the lifting cylinder lever 6 and lifting cylinder 7 are borne for rotation.

I claim:

1. An elevating platform system, having a parallelogram-shaped lifting mechanism, for attachment to vehicles, the system comprising:

a first carrier arm for carrying the platform;

a second carrier arm for carrying the platform, said second carrier arm horizontally separated from said first carrier arm;

a pivot axis on which said first and said second carrier arms are borne for rotation;

a parallel cylinder for pivoting the platform from a vertical traveling position into a horizontal working position and vice versa;

a lifting cylinder lever, borne for rotation about said pivot axis;

a lifting cylinder engaging said lifting cylinder lever for raising and lowering the platform in a working position thereof, said lifting cylinder and said lifting cylinder lever cooperating to form a force triangle;

a torsion profile connected between said lifting cylinder lever and said second arm; and a spring unit supported on one side by said first carrier arm and communicating, at another side, with said lifting cylinder lever or with an end of said lifting cylinder to elastically couple said first carrier arm to said lifting cylinder lever for motion in a lifting direction.

2. The elevating platform system of claim 1, wherein said first carrier arm and said lifting cylinder lever are borne for rotation about said pivot axis, independent of each other.

3. The elevating platform system of claim 1, wherein said spring unit comprises a compression spring or a rubber spring.

4. The elevating platform system of claim 1, wherein said lifting cylinder lever comprises an inward arm and an outward arm, said inward and outward arms being parallel and separated from each other, wherein said first carrier arm is disposed between said inward and said outward arms.

5. The elevating platform system of claim 4, further comprising a connecting device mounted to one of said inward and said outward arms of said lifting cylinder lever, supporting said torsion profile, and seating on an other one of said inward and said outward arms of said lifting cylinder lever.

6. The elevating platform system of claim 5, wherein said connecting device is mounted to said inward arm.

7. The elevating platform system of claim 5, wherein said connecting device is connected to a side of one of said inward and said outward arms of said lifting cylinder lever and seats on both said inward and said outward arms.

8. The elevating platform system of claim 7, wherein said connecting device is connected to said inward arm.

9. The elevating platform system of claim 5, wherein said connecting device has a connecting plate with a window through which said first carrier arm, said inward and said outward arms of said lifting cylinder lever, and said lifting cylinder protrude, and with an upward support which seats on both of said inward and said outward arms.

10. An elevating platform system, having a parallelogram-shaped lifting mechanism, for attachment to vehicles, the system comprising:

a pivot axis;

a lifting cylinder lever, borne for rotation about said pivot axis;

a first carrier arm for carrying the platform said first carrier arm being borne for rotation on said lifting cylinder lever at a radial separation from said pivot axis;

a second carrier arm for carrying the platform, said second carrier arm borne for rotation on said pivot axis and horizontally separated from said first carrier arm;

a parallel cylinder for pivoting the platform from a vertical traveling position into a horizontal working position and vice versa;

a lifting cylinder engaging said lifting cylinder lever for raising and lowering the platform in a working position thereof, said lifting cylinder and said lifting cylinder lever cooperating to form a force triangle;

a torsion profile connected between said lifting cylinder lever and said second arm; and a spring unit supported on one side by said first carrier arm and communicating, at another side, with said lifting cylinder lever or with an end of said lifting cylinder to elastically couple said first carrier arm to said lifting cylinder lever for motion in a lifting direction.

* * * * *